US011514526B1

(12) United States Patent
Kwartler et al.

(10) Patent No.: US 11,514,526 B1
(45) Date of Patent: Nov. 29, 2022

(54) SYSTEMS AND METHODS FOR PROPERTY DAMAGE RESTORATION PREDICTIONS BASED UPON PROCESSED DIGITAL IMAGES

(71) Applicant: Liberty Mutual Insurance Company, Boston, MA (US)

(72) Inventors: Edward Kwartler, Boston, MA (US); James Liu, Boston, MA (US)

(73) Assignee: LIBERTY MUTUAL INSURANCE COMPANY, Boston, MA (US)

( * ) Notice: Subject to any disclaimer, the term of this patent is extended or adjusted under 35 U.S.C. 154(b) by 437 days.

(21) Appl. No.: 15/598,119

(22) Filed: May 17, 2017

Related U.S. Application Data

(60) Provisional application No. 62/337,501, filed on May 17, 2016.

(51) Int. Cl.
*G06Q 40/08* (2012.01)
*G06T 7/13* (2017.01)
(Continued)

(52) U.S. Cl.
CPC ........... *G06Q 40/08* (2013.01); *G06K 9/6267* (2013.01); *G06N 5/04* (2013.01); *G06N 20/00* (2019.01);
(Continued)

(58) Field of Classification Search
CPC .................................................. G06Q 40/00
(Continued)

(56) References Cited

U.S. PATENT DOCUMENTS 6,397,334 B1 * 5/2002 Chainer ................. G01S 17/88
380/200
7,809,587 B2 10/2010 Dorai et al.
(Continued)

OTHER PUBLICATIONS

M. J. Liberatore and D. Breem, "Adoption and implementation of digital-imaging technology in the banking and insurance industries," in IEEE Transactions on Engineering Management, vol. 44, No. 4, pp. 367-377, Nov. 1997, doi: 10.1109/17.649867. (Year: 1997).*

(Continued)

*Primary Examiner* — Daniel S Felten
*Assistant Examiner* — Kevin T Poe
(74) *Attorney, Agent, or Firm* — Alston & Bird LLP

(57) ABSTRACT

Embodiments of the present invention provide methods, systems, apparatuses, and computer program products for predicting property damage restoration estimates. In one embodiment, a computing entity or apparatus is configured to receive, from a client device, a property damage restoration estimate request comprising one or more digital image files; retrieve policy data associated with a user of the client device, the policy data comprising user identification properties and policy properties; programmatically generate, by fraud detection/prediction circuitry and based on the one or more digital image files, a first predictive value, wherein the first predictive value represents a likelihood that at least one of the digital image files was fraudulently altered; upon identifying that the first predictive value does not exceed a fraud threshold, programmatically generate, by property restoration estimate prediction circuitry and based on the one or more digital image files, a second predictive value, wherein the second predictive value represents a property damage restoration estimate, wherein the second predictive value is based at least on the property properties contained in the policy data and the one or more digital image files; and (Continued)

substantially instantaneously transmit a property damage restoration estimate response comprising the property damage restoration estimate to the client device.

12 Claims, 7 Drawing Sheets

(51) Int. Cl.
G06K 9/62 (2022.01)
G06N 5/04 (2006.01)
G06N 20/00 (2019.01)
G06V 10/75 (2022.01)
G06V 40/16 (2022.01)
G06Q 30/02 (2012.01)

(52) U.S. Cl.
CPC .............. *G06T 7/13* (2017.01); *G06V 10/751* (2022.01); *G06V 40/172* (2022.01); *G06Q 30/0283* (2013.01); *G06T 2207/10024* (2013.01)

(58) Field of Classification Search
USPC ............................................................ 705/4
See application file for complete search history.

(56) References Cited

U.S. PATENT DOCUMENTS

| | | | |
|---|---|---|---|
| 8,428,300 B2 | 4/2013 | Pohjola et al. | |
| 8,510,196 B1 | 8/2013 | Brandmaier et al. | |
| 8,559,706 B2 | 10/2013 | de Zeeuw et al. | |
| 8,712,893 B1* | 4/2014 | Brandmaier | G06F 16/51 |
| | | | 705/35 |
| 2002/0051577 A1 | 5/2002 | Kinjo | |
| 2003/0112263 A1 | 6/2003 | Sakai | |
| 2005/0224573 A1* | 10/2005 | Yoshizane | G06F 21/32 |
| | | | 235/379 |
| 2007/0068402 A1* | 3/2007 | Sanchez | H04N 1/0323 |
| | | | 101/93.42 |
| 2007/0143158 A1* | 6/2007 | Cordery | G07D 7/206 |
| | | | 382/112 |
| 2009/0138290 A1 | 5/2009 | Holden | |
| 2009/0316962 A1* | 12/2009 | Sun | G06K 9/00248 |
| | | | 382/118 |
| 2011/0058048 A1* | 3/2011 | Elazar | H04N 1/32101 |
| | | | 348/207.1 |
| 2011/0106472 A1* | 5/2011 | Seo | G01J 3/02 |
| | | | 702/76 |
| 2011/0176712 A1* | 7/2011 | Hill | G06F 19/321 |
| | | | 382/128 |
| 2013/0136343 A1* | 5/2013 | de Zeeuw | G06K 9/00771 |
| | | | 382/162 |
| 2013/0191361 A1* | 7/2013 | Yu | G06Q 30/0256 |
| | | | 707/706 |
| 2014/0035720 A1* | 2/2014 | Chapman | B42D 25/309 |
| | | | 340/5.51 |
| 2014/0316825 A1 | 10/2014 | Van Dijk et al. | |
| 2015/0317739 A1* | 11/2015 | Lawlor | G06Q 30/0283 |
| | | | 705/4 |
| 2015/0363717 A1* | 12/2015 | Lim | G06Q 10/0633 |
| | | | 705/4 |
| 2016/0026253 A1* | 1/2016 | Bradski | G02B 27/225 |
| | | | 345/8 |
| 2016/0196417 A1* | 7/2016 | Tokunaga | G06K 9/00228 |
| | | | 726/19 |
| 2016/0283975 A1* | 9/2016 | Kaul | G06Q 50/01 |
| 2017/0270612 A1* | 9/2017 | Howe | G06Q 30/0278 |

OTHER PUBLICATIONS

Zangeneh, et al., "Image Forgery Detection Based on Repetitive Regions," *Journal of Science and Today's World*, 3(10):481-484, (2014).
Baron, "Adobe Photoshop Forensics: Sleuths, Truths, and Fauxtography," 2008, Insurance Fraud Section, pp. 57-58, True Lies Section, p. 281, Cengage Course Technology PTR, Boston, MA.

* cited by examiner

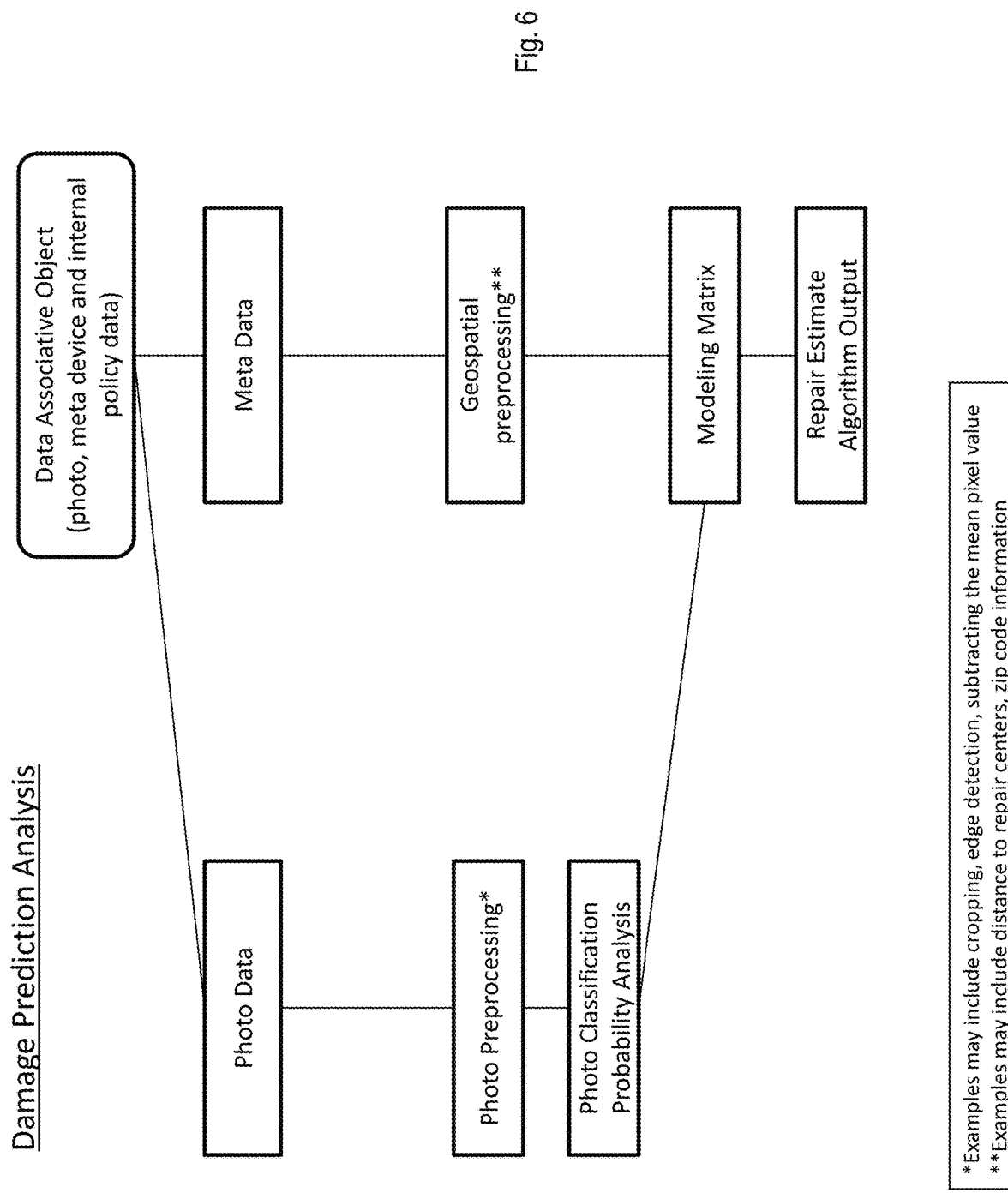

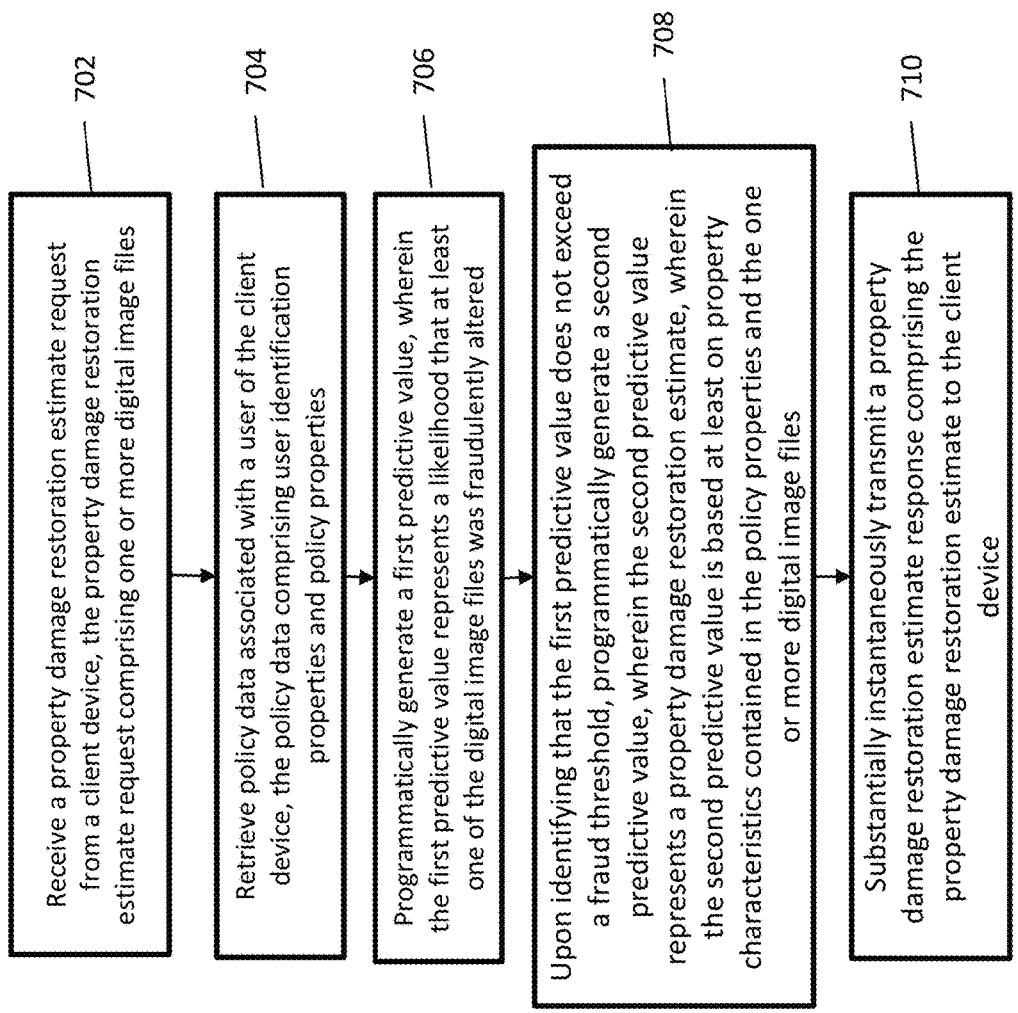

SYSTEMS AND METHODS FOR PROPERTY DAMAGE RESTORATION PREDICTIONS BASED UPON PROCESSED DIGITAL IMAGES

CROSS REFERENCE TO RELATED APPLICATIONS

The present application claims the benefit of U.S. Provisional Application Ser. No. 62/337,501, titled "AUTOMOBILE REPAIR PREDICTION," filed May 17, 2016, the contents of which are incorporated by reference herein in their entirety.

BACKGROUND

Applicant has identified a number of deficiencies and problems associated with property damage repair or restoration requests and estimates. Through applied effort, ingenuity, and innovation, many of these identified problems have been solved by developing solutions that are included in embodiments of the present invention, many examples of which are described in detail herein.

SUMMARY

This specification relates to programmatically generated predictions of property damage restoration estimates based upon processed digital images. In one embodiment, a computing entity or apparatus is configured to receive, from a client device, a property damage restoration estimate request comprising one or more digital image files; retrieve policy data associated with a user of the client device, the policy data comprising user identification properties and policy properties; programmatically generate, by fraud detection/prediction circuitry and based on the one or more digital image files, a first predictive value, wherein the first predictive value represents a likelihood that at least one of the digital image files was fraudulently altered; upon identifying that the first predictive value does not exceed a fraud threshold, programmatically generate, by property restoration estimate prediction circuitry and based on the one or more digital image files, a second predictive value, wherein the second predictive value represents a property damage restoration estimate, wherein the second predictive value is based at least on the property properties contained in the policy data and the one or more digital image files; and substantially instantaneously transmit a property damage restoration estimate response comprising the property damage restoration estimate to the client device.

The details of one or more example embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
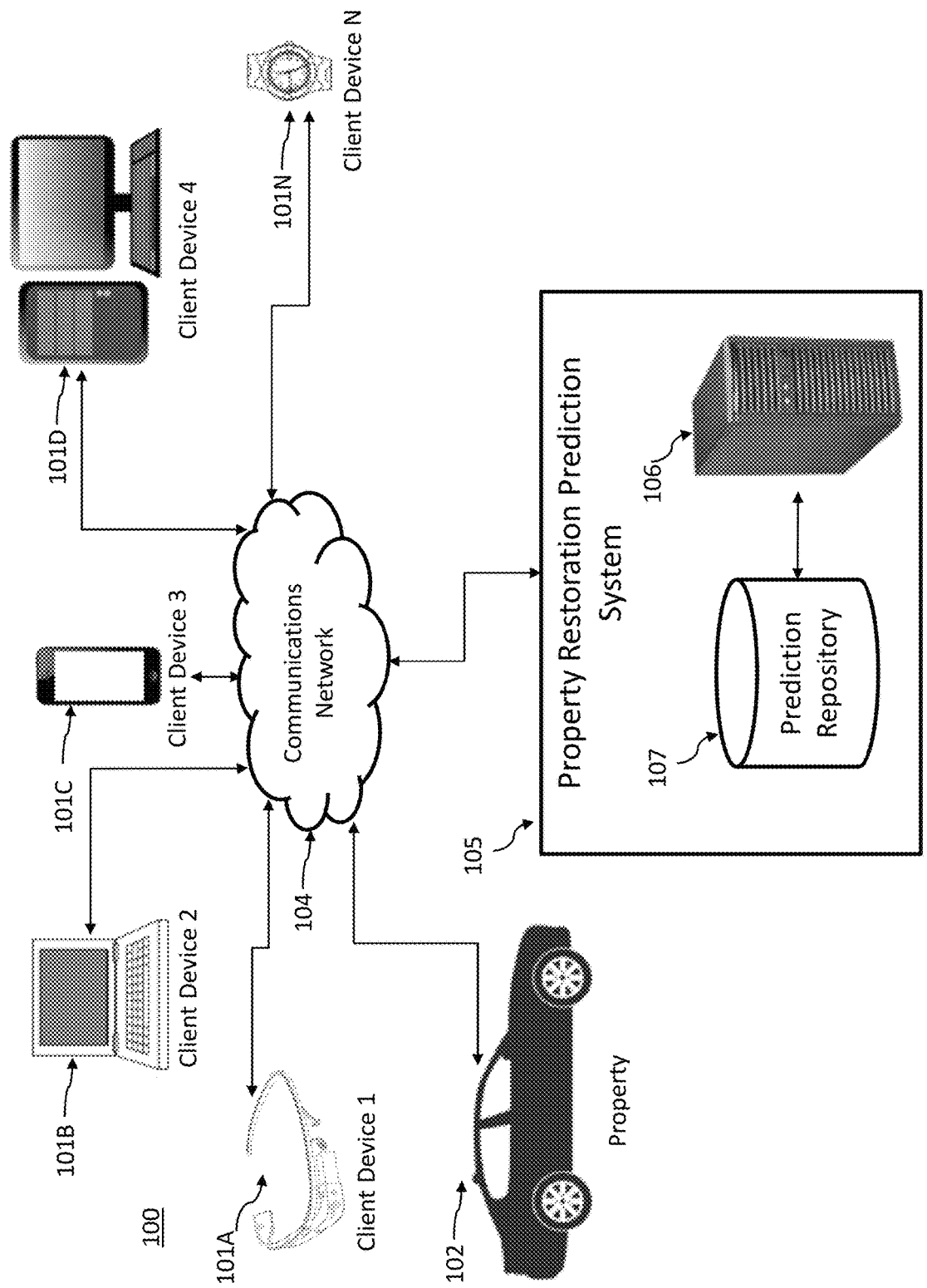

Having thus described the invention in general terms, reference will now be made to the accompanying drawings, which are not necessarily drawn to scale, and wherein:

FIG. 1 is a diagram of a system that can be used to practice various embodiments of the present invention.

Figure 2:
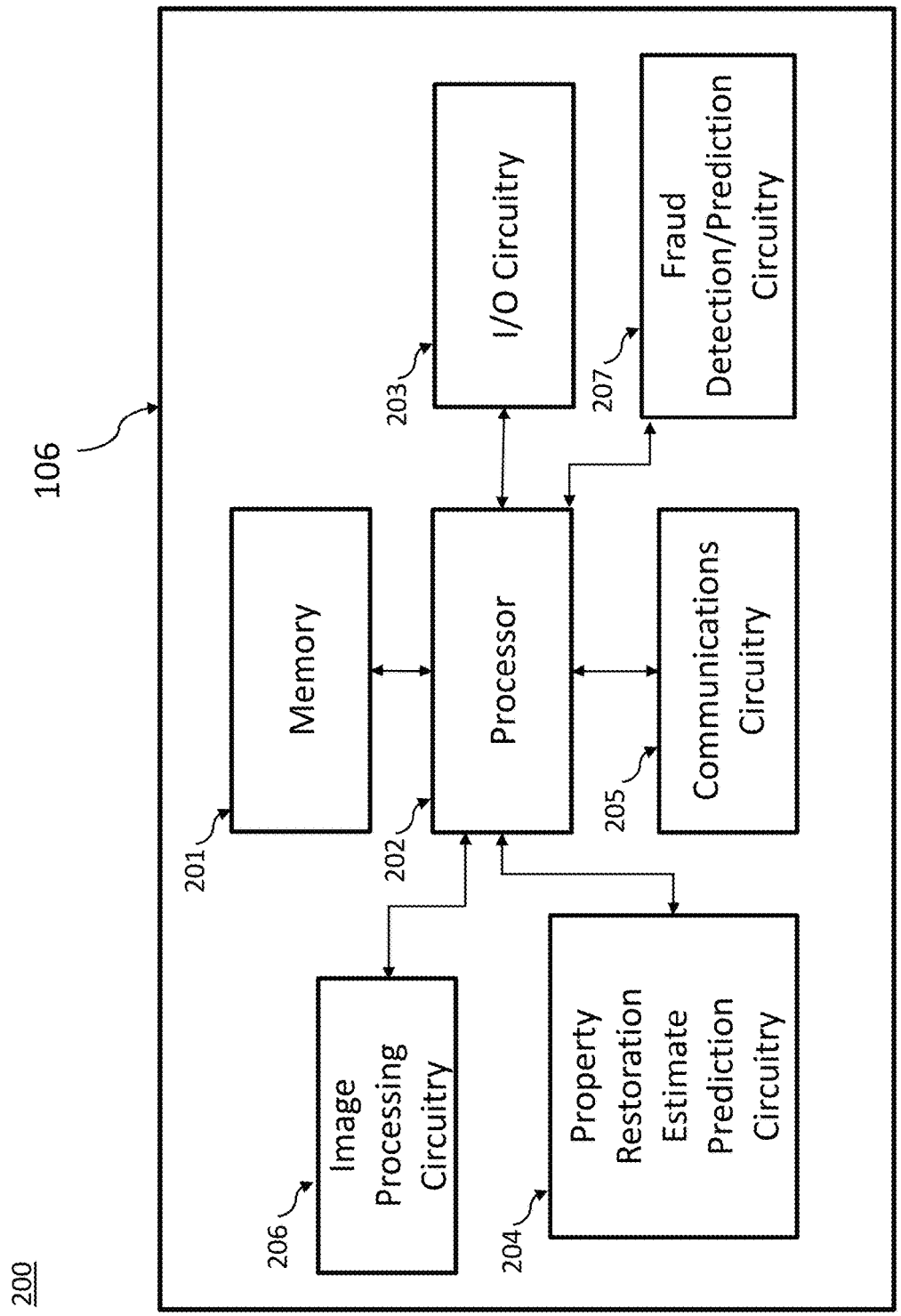

FIG. 2 is a schematic of a prediction server in accordance with certain embodiments of the present invention.

Figure 3:
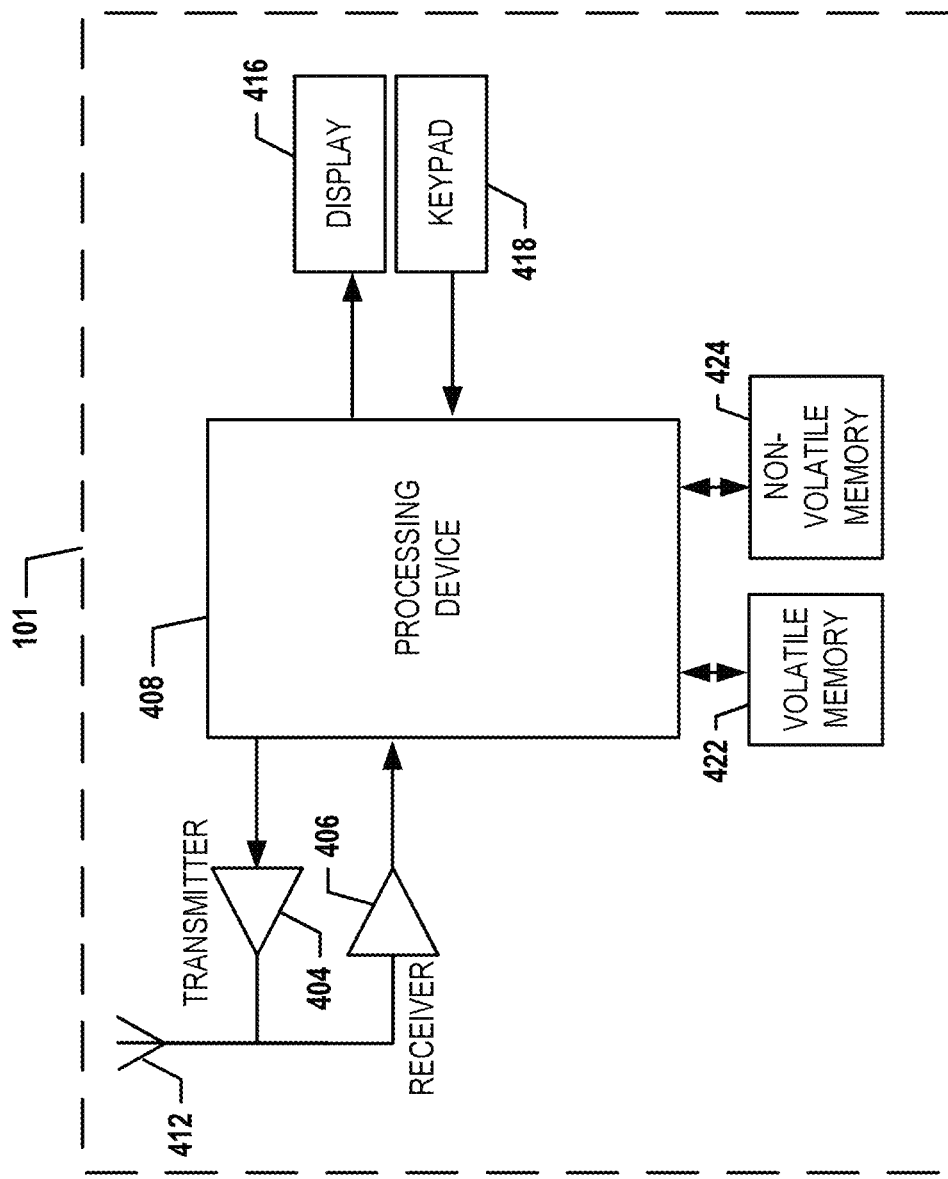

FIG. 3 is a schematic of a client device in accordance with certain embodiments of the present invention.

Figure 4:
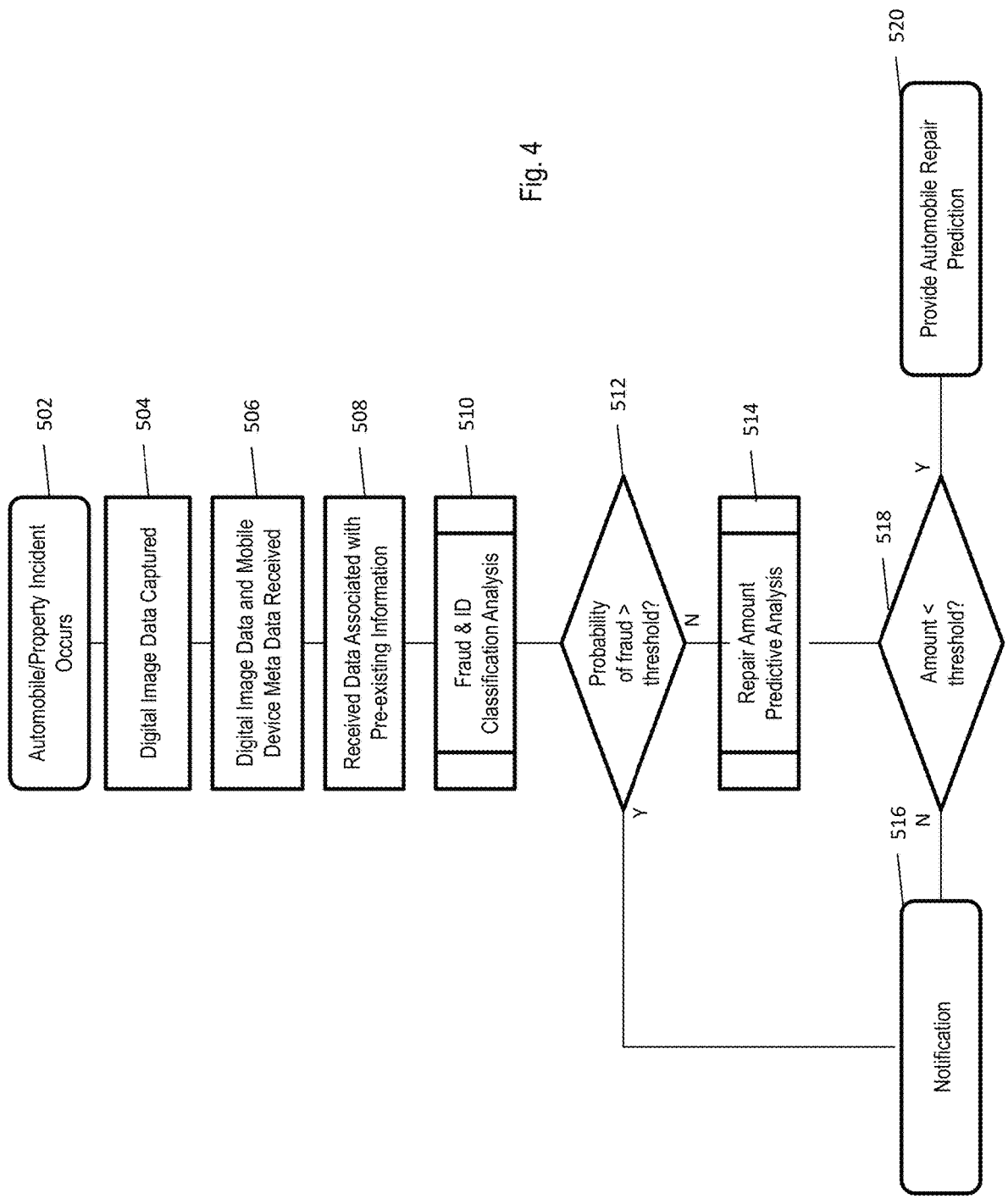

FIG. 4 is a flowchart illustrating various processes and procedures for providing a user with a predicted property damage repair estimate.

Figure 5:
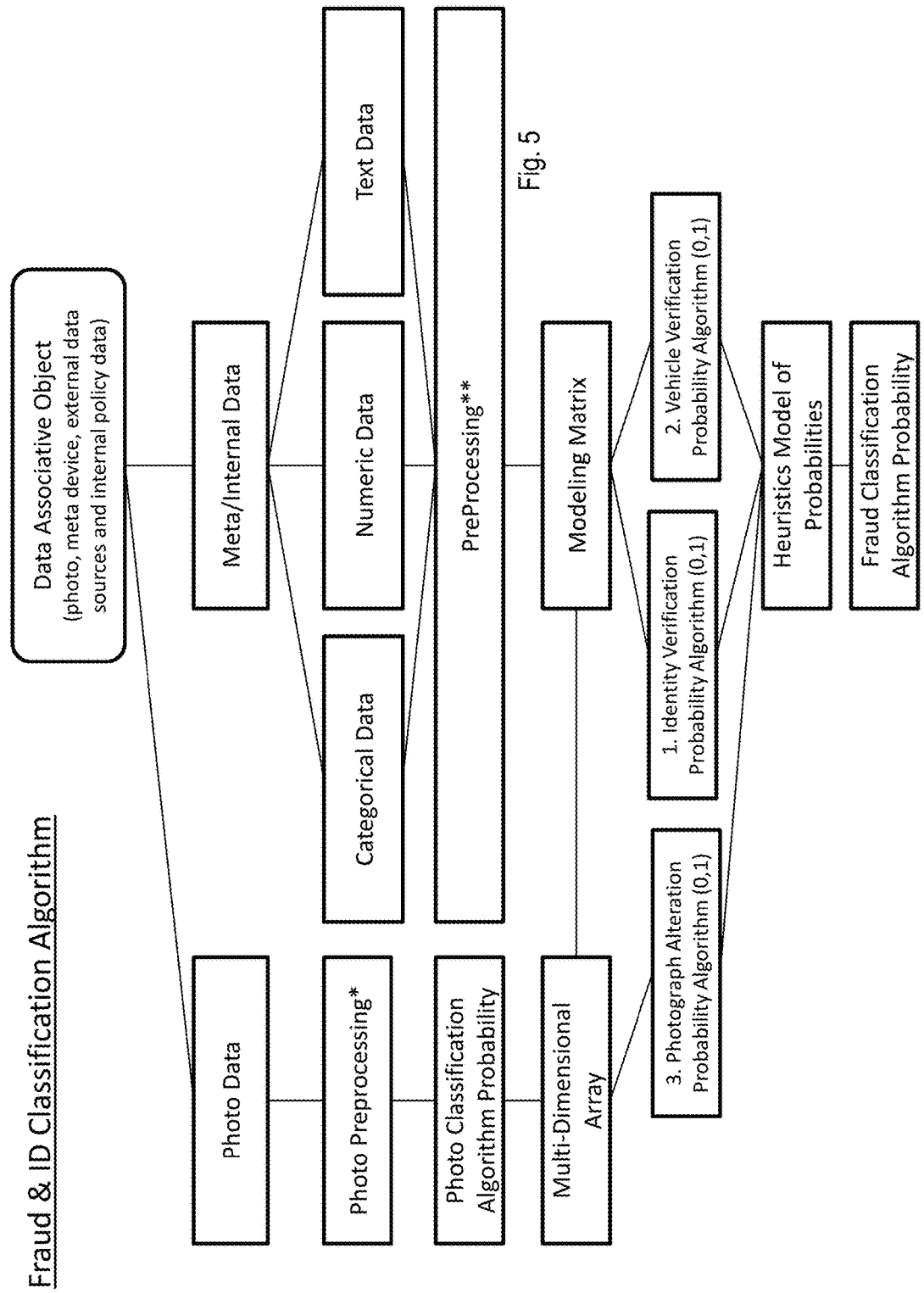

FIG. 5 is a flowchart illustrating various processes and procedures for providing a user with a predicted property damage repair estimate.

FIG. 6 is a flowchart illustrating various processes and procedures for providing a user with a predicted property damage repair estimate.

FIG. 7 is a flowchart illustrating various processes and procedures for providing a user with a predicted property damage repair estimate.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the present invention generally related to programmatically generated predictions of property damage restoration estimates based upon processed digital images. Various embodiments of the present invention may provide users of client computing devices with a mobile computing based application (or "app") and/or Internet based portal for submitting a property damage restoration estimate request (or "automobile repair prediction request") and receiving a property damage restoration estimate response (or "automobile repair prediction"). In various embodiments, a prediction server may determine property damage restoration estimate request ("an automobile repair prediction") based on a submitted property damage restoration estimate request ("automobile repair prediction request") comprising one or more digital image files and provide the property damage restoration estimate response ("automobile repair prediction"). In example embodiments, the prediction server may further conduct a fraud analysis on the one or more digital image files of the submitted property damage restoration estimate request ("automobile repair prediction request"). While property damage restoration estimate requests (or more specifically, automobile repair predictions) will be described herein, aspects of the invention may be used to provide restoration estimate predictions for property other than automobiles.

According to some embodiments, the property damage restoration estimate request comprises digital image files containing images depicting property damage as well as an image depicting a facial view of a policy holder. The property damage restoration estimate request may further comprise metadata associated with the client device sending the property damage restoration estimate request as well as with the property under review (e.g., an automobile may have sensor data associated therewith and the sensor data can be collected by the client device and/or directly through a network by the property damage restoration prediction system).

After a client device captures a digital photograph (i.e., digital image file) of property (e.g., automobile) damage and another digital photograph (i.e., digital image file) of a policy holder's face, the digital image files and device metadata including but not limited to geolocation, unique identity information such as a phone number, device sensor data from sources including but not limited to accelerometer, compass, recorded rotational forces, depth perception and characteristics, and timestamp are retrieved by a remote server (e.g., prediction server). The server system creates a unique claim identifier and associates it with all client device data retrieved, and retrieves preexisting policy information and externally sourced information such as but not limited to a credit score. The entirety of the information and unique identifier are saved to a prediction repository. The server transmits a notification of receipt along with the claim identifier to the client device along with an in progress or system processing message. The server processes the client data using machine learning techniques. The server organizes the client data in a manner acceptable to machine learning algorithms for example pixel level red, yellow and green values into a multidimensional array, or matrix of inputs from the information payload to create a data associative object. A fraud prediction model is trained with a binary outcome producing a probability of fraud. If a fraud probability cutoff threshold is exceeded a message is sent to the client device. If the fraud probability cutoff threshold is not exceeded then a trained predictive model (e.g., trained on all available data to resulting in a total cost to repair the vehicle) processes the data and predicts a property restoration estimate. The predictions from both models are saved to the prediction repository associated to the unique claim identifier.

According to some embodiments, the digital images are multi-dimensional arrays so machine learning models such as deep, convolutional neural nets or xgboost approaches can be trained to assess the total amount of damage compared to a non-damaged piece of property (e.g., an automobile model compared to similar automobile models in various states of repair or disrepair). Further filters like edge detection can be first applied to "sharpen" or "diffuse" the digital image for important features.

According to some embodiments, each row of a multi-dimensional array represents a row of pixels, while, similarly, each column represents a column of pixels. The values within each cell represent the color saturation or intensity for a particular color. Colors can be represented by red, green, and blue saturation values so the multidimensional aspect is the information captured in these three dimensions. Using this or a similar approach an algorithm or predictive model can identify the expected shape of a car much like facial recognition on a digital camera. The degree to which the expected shape of a car is recognized may lead to an indication of the damage occurring.

Property damage is unavoidable, whether to an automobile or a home or other structure. Notifying a policy provider that provides coverage for restoration of the property (i.e., repair for the damage) requires several steps and much analysis, and delay between submission of a notification and a response including an estimate and offer for acceptance of the estimate can be quite large (e.g., hours, days, weeks, etc.). The inventors have identified that the system resources and time allocated to predicting a cost estimate to repair property and offer the estimate for acceptance are easily exhausted and compromised as a result of customer effort to notify a loss, wait time associated with claims processing, and human claims adjustment bias. The inventors have identified that using digital image processing and machine learning for detection and prediction of fraudulent digital images or digital image attributes as well as for prediction of property damage restoration estimates significantly reduces system resources and turn-around-time for calculating and predicting such estimates.

Definitions

As used herein, the terms "data," "content," "digital content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In general, the terms computing entity, entity, device, client device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

The term "user" should be understood to refer to an individual, group of individuals, business, organization, and the like; the users referred to herein are accessing a property restoration prediction system using client devices.

The term "automatic" or "automatically" refers to any step or steps of an electronic process or processes that takes place without interaction by an outside entity.

The term "substantially instantaneous" refers to a timeframe in which something electronically occurs, meaning without contextually meaningful delay. For example, a client device submits a request and expects an almost immediate response, such that contextually meaningful delay might be 10 minutes or more in such a situation.

The term "electronically notify" refers to an electronic transmission of data indicative of a notification. For example, an electronic notification may comprise a text message, an email, a pop-up notification, or some combination of one or more of text, audio, or video content sufficient to display on a client device a conveyance of a notification.

The term "network time" refers to timestamps defined by a computer, server, or communications network. A timestamp is a sequence of characters or encoded information identifying when a certain event occurred, usually giving date and time of day, sometimes accurate to a small fraction of a second.

Example System Architecture

An apparatus performing various embodiments described herein may be embodied by any of a variety of devices. For example, the apparatus of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present invention may operate. Users may access a property restoration prediction system 105 via a communications network 104 using any of a variety of client devices 101A-101N. The property restoration prediction system 105 may comprise at least one server 106 in communication with at least one prediction repository 107. In embodiments where the property 102 is itself a smart object (e.g., includes network communications capability), the client devices 101A-101N and the property restoration predictions system 105 may also communicate with property 102 over communications network 104. Additionally or alternatively, property 102 may comprise a plurality of sensors through which data that is useful for property restoration predictions system 105 is collected via the communications network 104.

Communications network 104 may include any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, these networks may have any suitable communication range associated therewith and may include, for example, global networks (e.g., the Internet), metropolitan area networks (MANs), wide area networks (WANs), local area networks (LANs), or personal area networks. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

The server 106 may be embodied as a computer or computers as known in the art. The server 106 may provide for receiving of electronic data from various sources, including but not necessarily limited to the client devices 101A-101N. For example, the server 106 may be operable to receive communications in the form of digital prediction requests provided by the client devices 101A-101N. The server 106 may also transmit communications in the form of digital prediction responses to the client devices 101A-101N. The server 106 may facilitate the substantially instantaneous prediction responses to one or more of client devices 101A-101N subsequent receipt of a digital prediction request from one or more of client devices 101A-101N.

The prediction repository 107 may be embodied as a data storage device such as a Network Attached Storage (NAS) device or devices, or as a separate database server or servers. The prediction repository 107 includes information accessed and stored by the server 106 to facilitate the operations of the property restoration prediction system 105. For example, the prediction repository 107 may include, without limitation, a plurality of property restoration prediction requests and associated attributes, and/or the like.

The client devices 101A-101N may be any computing device as defined above. Electronic data received by the server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, smart watch, or other wearable, the client device 101A-101N may execute an "app" to interact with the property restoration prediction system 105. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 10® (or other versions of these operating systems). These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the property restoration prediction system 105 via a web browser. As yet another example, the client device 101A-101N may include various hardware or firmware designed to interface with the property restoration prediction system 105.

An example of a data flow for exchanging electronic information among one or more client devices 101A-101N and the property restoration prediction system 105 is described below.

In the depicted embodiment, the one or more client devices 101A-101N are configured to generate digital property restoration prediction requests intended to be transmitted to the property restoration prediction system 105. The digital property restoration prediction requests are transmitted by wired or wireless communication over the communications network 104 to the property restoration prediction system 105.

The server 106 stores the digital property restoration prediction requests in the prediction repository 107. It will be appreciated that prediction repository 107 may be one or more repositories, and may be part of or separate from server 106.

The property restoration prediction system 105, upon confirming that the digital property restoration prediction request does not contain any fraudulent data objects, performs the requested services and returns results via communications network 104 to the requesting client device(s) (101A-101N).

Example Apparatus for Implementing Embodiments of the Present Invention

The server 106 may be embodied by one or more computing systems, such as apparatus 200 shown in FIG. 2. The apparatus 200 may include a processor 202, a memory 201, input/output circuitry 203, communications circuitry 205, image processing circuitry 206, fraud detection and prediction circuitry 207, and property restoration estimate prediction circuitry 204. The apparatus 200 may be configured to execute the operations described above with respect to FIG. 1 and below with respect to FIGS. 4-5. Although these components 201-207 are described in part using functional limitations, it should be understood that implementations of these components necessarily include the use of particular hardware. It should also be understood that certain of these components 201-207 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor 202 and/or input/output circuitry 203 may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The image processing circuitry 206 includes hardware configured to process digital image files. The image processing circuitry 206 may utilize processing circuitry, such as the processor 202, to perform these actions. The image processing circuitry 206 may send and/or receive data from property restoration estimate prediction circuitry 204 and fraud detection/prediction circuitry 207. In some implementations, the sent and/or received data may be of processed and/or unprocessed digital image files. It should also be appreciated that, in some embodiments, the functions of the image processing circuitry 206 may be performed by a separate processor, specially configured field programmable gate array (FPGA), or application specific interface circuit (ASIC).

The fraud detection and prediction circuitry 207 includes hardware configured to detect fraudulently altered digital image files and predict, based upon received digital image files, the likelihood of a digital image file having been fraudulently altered. The fraud detection and prediction circuitry 207 may utilize processing circuitry, such as the processor 202, to perform these actions. The fraud detection and prediction circuitry 207 may send and/or receive data from property restoration estimate prediction circuitry 204 and image processing circuitry 206. In some implementations, the sent and/or received data may be of processed and/or unprocessed digital image files and fraud predictions. It should also be appreciated that, in some embodiments, the functions of the fraud detection and prediction circuitry 207 may be performed by a separate processor, specially configured field programmable gate array (FPGA), or application specific interface circuit (ASIC).

The property restoration estimate prediction circuitry 204 includes hardware configured to generate cost estimates for restoring property. The property restoration estimate prediction circuitry 204 may utilize processing circuitry, such as the processor 202, to perform these actions. The property restoration estimate prediction 204 may send and/or receive data from image processing circuitry 206 and fraud detection/prediction circuitry 207. In some implementations, the sent and/or received data may be of digital property restoration estimate requests, including digital image files. It should also be appreciated that, in some embodiments, the functions of the property restoration estimate prediction 204 may be performed by a separate processor, specially configured field programmable gate array (FPGA), or application specific interface circuit (ASIC).

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

FIG. 3 provides an illustrative schematic representative of a client device 101 that can be used in conjunction with embodiments of the present invention. In one embodiment, the client device 101 may include one or more components that are functionally similar to those of server 106 and/or as described below. In general, a client device 101 is a computing entity operated by and/or on behalf of a user (e.g., accessing an application provided by server 106, accessing a website hosted by the server 106, and/or the like). As shown in FIG. 3, a client device 101 can include an antenna 412, a transmitter 404 (e.g., radio), a receiver 406 (e.g., radio), and a processing element 408 that provides signals to and receives signals from the transmitter 404 and receiver 406, respectively. In various embodiments, the client device 101 may further comprise a digital image capturing element (e.g., a digital camera), a location sensor (e.g., GPS sensor), and/or the like.

The signals provided to and received from the transmitter 404 and the receiver 406, respectively, may include signaling information/data in accordance with an air interface standard of applicable wireless systems to communicate with various entities, such as server 106, and/or the like. In this regard, the client device 101 may be capable of operating with one or more air interface standards, communication protocols, modulation types, and access types. More particularly, the client device 101 may operate in accordance with any of a number of wireless communication standards and protocols. In a particular embodiment, the client device 101 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the client device 101 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The client device 101 can also download changes, add-ons, and updates, for instance, to its firmware, software (e.g., including executable instructions, applications, program modules), and operating system.

According to one embodiment, the client device 101 may comprise a location sensor and/or other location determining aspects, devices, modules, functionalities, and/or similar words used herein interchangeably. For example, the client device 101 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the client device's 101 position in connection with a variety of other systems, including cellular towers, Wi-Fi access points, and/or the like. Similarly, the client device 101 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The client device 101 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the client device 101 to interact with and/or cause display of information. The user input interface can comprise any of a number of devices allowing the client device 101 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the client device 101 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the customer device can collect contextual information/data as part of the telematics data.

The client device 101 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the client device.

Fraud Detection (FIG. 5)

Automating property restoration estimate predictions, as described herein, improves both the repeatability and the speed of estimate generation. In conjunction with these benefits, or in many cases because of them, automation of estimate generation also introduces a new risk of fraudulent claim requests. To address this added risk requires the introduction of a fraud detection model that has historically not been necessary in systems reliant upon human claims adjusting.

The fraud detection model described herein first attempts to verify a user's identity, and its output comprises a binary result between 0 and 1 representing a likelihood that the identity corresponds to that claimed in an initial property damage restoration estimate request. Next, the fraud model verifies the user's property is covered under the user's existing policy. The result of this verification may also be a binary probability output between 0 and 1 indicating a likelihood that the property is covered. Next, the fraud model assesses the digital image file of the damaged property at the pixel level to identify patterns for verifying that the digital image file was not altered. The result may be a binary probability output between 0 and 1 indicating a likelihood that the digital image file has been fraudulently tampered with. Some combination of these three probability outcomes may then be combined as inputs to one or more of machine learning or heuristics that determine a final overall fraud index or probability between 0 and 1.

According to some embodiments, a data associative object including a person's personally identifiable information is provided with the initial property damage restoration estimate request. This data associative object may include the individual's phone number, location and proximity to policy address, and a photograph of the person's face, and this information may be organized into a modeling matrix for use in a machine learning model that uses, for example, a regularized logistic regression or extreme gradient boosting trees method. The modeling matrix stores photographic information in the form of a multi-dimensional array of red, green and blue pixel values, and categorical, numeric and text data.

In some embodiments, the data associative object is retrieved from a repository based upon identification data provided with the initial property damage restoration estimate request.

Examples of categorical data may include but are not limited to phone numbers, or days of the week the information that was received (e.g., this is gleaned via network timestamps). The categorical information is preprocessed, for example, creating numeric interpretations for days of the week from 1 to 7 or a Boolean TRUE or FALSE value if the mobile phone number contained in the data associative object matches a known phone number in the internal user database. Example numeric inputs may include the distance from the known user address to the location contained in the data associative object or number of days since a previous claim. Additional numeric preprocessing including data normalization may be necessary. For example, a consistent unit of measure such as kilometers may need to be converted or scaling the numeric data by subtracting the mean and dividing by the standard deviation. Another input to the modeling matrix may include natural language and free form text to help verify the person's identity. Example inputs may include previous customer service notes. The modeling matrix may include specific term extractions represented as Boolean values or term frequencies in the form of a document term matrix which is appended to the modeling matrix of other inputs. Lastly, the multi-dimensional array from a client's facial picture, often referred to as a "selfie," can be used as an input to the identity verification probability algorithm. The selfie may be compared to an existing and verified user picture for example from a driver's license or state issued identification card.

These multiple inputs may be further changed as suitable for specific machine learning algorithms. The output of the machine learning algorithm or ensemble algorithm is a numeric value between 0 and 1 where 1 represents a certain match that the person providing the information payload that created the data associative object is the person represented in the customer database.

According to further embodiments, the data associative object and resulting modeling matrix is re-used to verify that the vehicle in the associative data object shares known attributes of the insured vehicle or policy associated vehicle. In some embodiments, the known attributes are retrieved from a repository based upon the data associative object or other identifying data provided in the initial property damage restoration estimate request. This procedure thus enables the filtration of fraudulent requests, such as when a user provides a pickup truck in the information payload but the user database insures a passenger sedan which typically has a smaller vehicle outline. The modeling matrix based on the data associative object includes photographic information of the received vehicle and known vehicle in the form of pixel values and other vehicle attributes. The differences among the received pixel values and expected vehicle shapes is learned prior to this use of the modeling matrix as part of a convolutional neural network or similar deep learning method. Further a convolutional neural network learns from the modeling matrix inputs such as color of the vehicle and expect consistency with the known customer database. The final model includes a convolutional neural network and multiple other algorithmic classifiers such support vector machines, and gradient boosted machines in a mean average ensemble to arrive at a final probability value between 0 and 1 determining if the vehicle described in the data associative object is the insured vehicle. Values approaching 1 represent a high probability the vehicle in the data associative object from the client is the insured vehicle.

According to further embodiments, data contained within the digital image file representing the damaged property is organized into a multi-dimensional array of pixel values, red, green, and blue. This contrasts with the previous two algorithms, identity and vehicle verification in that the algorithm inputs do not include all information in the associative data object. Preprocessing of the photograph identifies if the photo has been altered in some way.

For example edge detection of the vehicle, subtracting mean pixel level values across the array, and error level analysis are applied among other techniques appropriate to identify doctored information in the photograph or digital image file. These inputs are used in both heuristic based assessments and also convolutional neural networks to identify pixel kernels or groupings (e.g., 3 by 3 square, 9 by 9 square, tiles/kernels, etc.) that have been altered. The goal of this algorithm is to identify if a user has manually or programmatically manipulated the digital image to increase the appearance of the property damage. The output of either heuristic based approaches or algorithms is a value between 0 and 1 for determining if the photo was changed. Values approaching or including 1, for example, indicate the photo has not been altered.

The data described above is appended to the data associative object. A heuristic or rule based approach may then be applied to the outcome probabilities. For example if all probabilities are above 0.50 then the overall fraud determination may be considered approved (i.e., it is determined that no fraud is suspected). As a result, the damage prediction model/algorithm may be applied to the data associative object and subsequently appropriate messages are transmitted to the client device.

It will be appreciated that pixel level fraud is not detectable by the human eye, therefore such analyses as described herein ensure accuracy of fraud detection and associated property damage restoration predictions in ways that are not possible without machine implementation.

Property Damage Restoration Prediction (FIG. 6)

As described above, a data associative object was used to create a modeling matrix comprising photographic information, mobile device payload information such as sensor data as well as internal and external databases. A subset of the aforementioned modeling matrix is used in some embodiments to generate a property damage restoration prediction (e.g., it does not include photographic self-portraits or data variables that are regulated in insurance claims). Additional inputs that are included for damage restoration prediction may include the location of the information payload from the client device. For example, repairs in Cleveland may be less expensive than repairs in Boston. Known policy information such as vehicle make, model and year is also included because those pieces of data are known to be important factors for repair/restoration costs. For example repairing an older mass market sedan may be less expensive than a new exotic sports car. Device sensor data such as depth and accelerometer information is also included in the modeling matrix subset. The depth of an impact or the speed at which the impact occurred may be informative to the extent of damage and resulting repair amount. The previously described multi-dimensional array with appropriate filters is used to extract pixel kernels identifying damaged vehicle sections. A modeling matrix comprising the multi-dimensional photo data and appropriate metadata is used to predict a total dollar amount to repair the damage in the vehicle. The outcome of this convolutional neural net ensemble with other machine learning methods is a continuous value representing US dollars or other currency estimating a vehicle repair cost.

Example Processes for Property Restoration Prediction

FIG. 4 provides a flowchart illustrating various processes and procedures for providing a predicted property damage restoration estimate. In example embodiments, a prediction request may be submitted as an insurance claim submission, and the prediction determined and/or provided as part of an insurance claim processing and resolution.

Starting at block 502, an automobile or property incident occurs. For example, an automobile owned by a user and/or a family, group, organization, company, and/or the like comprising and/or associated with the user may be involved in an accident, a weather and/or environmental event, and/or the like. For example, the automobile may be driven into a mail box, be involved in a collision with another vehicle, slide on black ice and end up off the road, be hailed on, have a tree limb fall on it, and/or the like. The automobile incident may cause damage to the automobile.

At block 504, the user may capture digital image data of the automobile and/or the damage experienced by the automobile. For example the user may operate a client device 101 to capture digital image data of a portion of the automobile comprising at least a portion of the damage experienced by the automobile. For example, the automobile is rear-ended by another vehicle, the digital image data captured may comprise a digital image of at least a portion of the automobile's rear bumper. In example embodiments, the digital image data may be captured through a digital camera application operating on the client device 101, through a dedicated application operating on the client device 101 provided by and/or associated with prediction server 106, or through a user interface of another application operating on the client device 101 (e.g., a web browser) engaged in a communication session with the server 106 (e.g., accessing a website affiliated with the server 106. The user device may then submit an automobile repair prediction request comprising digital image data, device metadata, and/or the like. For example, the user device may provide (e.g., transmit) at least a portion of the digital image data and/or device metadata. The device metadata may comprise one or more of geolocation, identity information, device sensor data and timestamp.

At block 506, the prediction server 106 receives the automobile repair prediction request. For example, the prediction server 106 may receive the digital image data, device meta data, and/or the like comprising the prediction request.

At block 508, the digital image data, device metadata, and/or the like is associated with existing user profile information stored and/or accessible to the prediction server 106. For example, the identity information of the device metadata may be used to identify a user policy profile corresponding to the user. The prediction request, or at least a portion thereof, may then be associated with (e.g., stored in association with) the user profile corresponding to the user.

At block 510, a fraud and identification analysis is performed. In example, embodiments, the fraud and identification analysis may comprise use of machine learning techniques. In an example embodiment, the prediction server 106 may perform a fraud and identification analysis using a machine learning algorithm. In one embodiment, the machine learning algorithm may be a binary outcome algorithm. For example, the prediction server 106 may process the digital image data and decompose the digital image data into a multi-dimensional array or matrix comprising pixel level color values of the captured digital image. For example, the prediction server 106 may process the digital image data and decompose the digital image data into a matrix comprising a pixel level red value, a pixel level green value, and a pixel level yellow for every pixel of at least an area of interest of the digital image. The matrix may then be analyzed to determine a probability of fraud. For example, the matrix may be analyzed to determine if the digital image encoded in the digital image data has been "photoshopped" and/or the like. For example, the fraud and id classification analysis may be performed to determine, generate, or calculate a probability of fraud (e.g., that the digital image data has been the true/actual current state of the automobile).

At block 512, it is determined if the probability of fraud is greater than a threshold probability. For example, the prediction server 106 may determine if the probability of fraud is greater than a threshold probability. For example, the threshold probability may be 90%, 80%, 75%, 70%, 60%, 50%, 40%, and/or the like, as applicable for the application.

If it is determined at block 512 that the probability of fraud is greater than a threshold probability, then the process continues to block 516. At block 516, a notification is provided (e.g., transmitted) to the user (e.g., through the client device 101). For example, the prediction server 106 may provide a notification. For example, a dedicated application or other application operating on the client device 101 may receive the notification and, in response thereto, display the notification on the device 101. The notification may indicate to the user that a repair prediction cannot be provided based on the submitted request due to issues with the digital image data, suspected fraud, and/or the like. The notification may provide the user with further information regarding other options for receiving a prediction.

If it is determined at block 512 that the probability of fraud is not greater than a threshold probability, then the process continues to block 514. At block 514, a repair amount predictive analysis is performed. For example, the prediction server 106 may perform a repair amount predictive analysis to determine, generate, or calculate a property restoration prediction. In example embodiments, the predictive analysis may comprise the use of a machine learning technique. For example, a machine learning algorithm may be used to determine, generate, or calculate a property damage restoration prediction. For example, the matrix or multi-dimensional array described above may be analyzed to determine or calculate how the digital image data differs from undamaged or similarly damaged digital image data of a similar automobile/property (e.g., an automobile having the same make, model, year, color, and/or the like). For example, the undamaged digital image data of the similar automobile may be an image of the automobile before the automobile incident of block 502 that was stored in association with the user profile, and/or the like. In another example, the undamaged digital image data is accessed from a database of undamaged digital image data comprising undamaged digital image data corresponding to a variety of vehicle types, makes, models, years, colors, and/or the like. In some embodiments, the digital image data (e.g., the matrix representing the digital image data) may be compared to a series of damaged digital image data having known repair costs (e.g., digital image data corresponding to digital images captured of automobiles for which the repairs have been performed and the repair cost is therefore known). Thus, a repair amount predictive analysis may be performed to determine, generate, or calculate an automobile repair prediction.

At block 518, it may be determined if the prediction is greater than a threshold amount. For example, if the prediction is greater than a threshold amount, it may be determined that an in-person analysis of the damage to the property should be conducted, that the property should be totaled, and/or the like. For example, the threshold amount may be a percentage of the property's value (e.g., 75% of the predicted and/or Kelly Blue Book value of the automobile, or the like) or a specific monetary value (e.g., $1000 or the like).

If it is determined at block 518 that the prediction is greater than the threshold amount, a notification is sent to the user (e.g., through the client device 101) at block 516. At block 516, a notification is provided (e.g., transmitted) to the user (e.g., through the client device 101). For example, the prediction server 106 may provide a notification. The notification may indicate to the user that repair prediction is greater than a threshold amount, and/or the like. The notification may provide the user with further information regarding other options, next steps, and/or other information.

If it is determined at block 518 that the prediction is not greater than the threshold amount, the repair prediction may be provided to the user (e.g., through the client device 101 at step 520). For example, at block 520, the prediction server 101 may provide a prediction communication. The prediction communication may indicate to the user an estimated amount for completing the property damage restoration, instructions for completing the restoration, an insurance claim settlement amount, insurance claim settlement instructions and/or other data to facilitate the automobile repair. For example, the prediction may include insurance claim settlement information.

In various embodiments the notification and/or prediction communication may be provided in real and/or near real time (substantially instantaneously). For example, the notification and/or prediction communication may be received by the client device 101 shortly after the user submits the prediction request, such that the user experiences receiving a response to the request a nearly instantly and/or in real time or near real time. By doing so, example embodiments thus unlock new functionality heretofore impossible using entirely manual methods of claims adjustment. For instance, when a user can receive a response to a prediction request in near real time, the user can take the property directly to a repair facility for damage restoration rather than needing to plan an entirely separate trip to do so at a later time. In a further example, when a user can receive a response to a prediction request in near real time, the user can decide whether to file an associated claim (e.g., if the predicted estimate exceeds a deductible) rather than require more time and resources for an in person estimate.

FIG. 7 provides a flowchart illustrating various processes and procedures for providing a predicted property damage restoration estimate.

A process 700 begins with receiving a property damage restoration estimate request from a client device, the property damage restoration estimate request comprising one or more digital image files 702. Policy data associated with a user of the client device is retrieved 704 from a repository, where the policy data comprises user identification properties and policy properties. A first predictive value is programmatically generated 706, by fraud detection/prediction circuitry and based on the one or more digital image files, a first predictive value, wherein the first predictive value represents a likelihood that at least one of the digital image files was fraudulently altered. Upon identifying that the first predictive value does not exceed a fraud threshold, a second predictive value is programmatically generated 708, by property restoration estimate prediction circuitry and based on the one or more digital image files, where the second predictive value represents a property damage restoration estimate, and the second predictive value is based at least on policy properties contained in the policy data and the one or more digital image files. Finally, a property damage restoration estimate response is substantially instantaneously transmitted 710, comprising the property damage restoration estimate, to the client device.

In some embodiments, the first predictive value is programmatically generated by causing the fraud detection/prediction circuitry to perform an identity confirmation procedure, a covered property confirmation procedure, and a pixel-level fraud calculation procedure.

In some embodiments, the user identification properties include a policy holder facial digital image file, and wherein the identity confirmation procedure comprises comparing, by the fraud detection prediction circuitry, a first digital image file of the one or more digital image files to the policy holder facial digital image file.

In some embodiments, the policy properties identify a property associated with the policy data, and wherein the covered property confirmation procedure comprises detecting a property represented in the one or more digital image files and comparing the property to the property associated with the policy data.

In some embodiments, a second digital image file of the one or more digital image files represents the property, wherein the pixel-level fraud calculation procedure comprises organizing data contained within the second digital image file into a multi-dimensional array of pixels, wherein a value of each pixel in the multi-dimensional array is red, green, or blue.

In some embodiments, the pixel-level fraud calculation procedure further comprises edge detection of the property within the second digital image, subtraction of mean pixel level values across the multi-dimensional array, and application of an error level analysis to identify pixel kernels in the multi-dimensional array that have been fraudulently altered.

In some embodiments, a pixel kernel comprises a rectangular subset of pixels within the multi-dimensional array.

In some embodiments, the property damage restoration estimate request further comprises a location, a property make, a property model, a property year, and sensor data received from the property.

In some embodiments, the second predictive value is programmatically generated based upon the location and sensor data.

In some embodiments, the sensor data comprises depth and accelerometer data.

In some embodiments, the second predictive value is programmatically generated based upon a pixel-level property detection procedure, comprising organizing data contained within a second digital image file of the one or more digital image files that represents the property a multi-dimensional array of pixel values, wherein the pixel values are one or more of red, green, and blue.

In some embodiments, the pixel-level property detection procedure further comprises edge detection of the property within the second digital image, subtraction of mean pixel level values across the multi-dimensional array, and application of an error level analysis to identify pixel kernels in the multi-dimensional array that represent damage to the property.

In some embodiments, the fraud detection/prediction circuitry is configured to programmatically generate the first predictive value using a machine learning model.

In some embodiments, the property restoration estimate prediction circuitry is configured to programmatically generate the second predictive value using a machine learning model.

In some embodiments, the fraud detection/prediction circuitry is configured to programmatically generate the first predictive value by comparing a property make, a property model, and a property year contained in the property data to a property make, a property model, and a property year detected in the one or more digital image files.

In some embodiments, a pixel kernel is a square of 9 pixels by 9 pixels.

In some embodiments, the property is an automobile.

In some embodiments, the multi-dimensional matrix comprises a matrix comprising a pixel level red value, a pixel level green value, and a pixel level yellow for every pixel of at least an area of interest of the digital image file.

In some embodiments, the apparatus receives sensor data from one or more of a client device and a property under review.

Additional Implementation Details

Although example processing systems have been described in FIGS. 2 and 3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for predicting a property damage restoration estimate, the apparatus comprising at least one processor and at least one memory including computer program code, wherein the computer program code, when executed by the at least one processor, cause the processor to perform the steps of:
   receiving, from a client device, a property damage restoration estimate request comprising a first set of one or more digital image files and device metadata, wherein a digital image file of the first set of one or more digital image files comprises a facial image and a plurality of pixels of a first digital image of one or more of a physical piece of property;
   retrieving, from a repository and based at least in part on the device metadata, policy data associated with a user of the client device, the policy data comprising user identification properties including a policy holder facial image file and policy properties;
   comparing the facial image to the retrieved policy holder facial image file;
   determining a likelihood that at least one of the first set of one or more digital image files was fraudulently altered by generating a first predictive value, wherein generating the first predictive value comprises:
     extracting each pixel of a plurality of pixels of each digital image file of the one or more digital files;
     generating, for each digital image file, a multi-dimensional matrix comprising the plurality of pixels;
     identifying, by evaluating each pixel based at least in part on a first machine learning model, any of the plurality of pixels or any groupings of pixels of the digital image file that have been manually or programmatically altered; and
     generating the first predictive value based on the comparison and the identifying of any of the plurality of pixels or any groupings of the digital image file that have been manually or programmatically altered;
   determining that the first predictive value does not exceed a fraud threshold;
   generating, based at least in part on the first set of one or more digital image files and the retrieved policy data, a property damage restoration estimate; and
   transmitting a property damage restoration estimate response comprising the property damage restoration estimate to the client device.

2. The apparatus of claim 1, wherein the property damage restoration estimate request further comprises a location, a property make, a property model, a property year, and sensor data from a property associated with the property damage restoration estimate.

3. The apparatus of claim 2, wherein the computer program code, when executed by the at least one processor, cause the at least one processor to perform steps further comprising:
   generating the property damage restoration estimate based at least in part on the location and sensor data.

4. The apparatus of claim 2, wherein the sensor data comprises depth and accelerometer data.

5. The apparatus of claim 1, wherein the computer program code, when executed by the at least one processor, cause the at least one processor to perform steps further comprising:
   generating the property damage restoration estimate based at least in part on a pixel-level property detection procedure performed by the at least one processor, the pixel-level property detection procedure comprising extracting data contained within a second digital image file of the one or more digital image files comprising a property into the multi-dimensional matrix, wherein the pixel values are one or more of red, green, or blue.

6. The apparatus of claim 5, wherein the pixel-level property detection procedure performed by the at least one processor further comprises:
   edge detection of the property within the second digital image;
   subtraction of mean pixel level values across the multi-dimensional matrix; and
   identifying pixel kernels in the multi-dimensional matrix that represent damage to the property based at least in part on error level analysis.

7. The apparatus of claim 1, wherein the first machine learning model comprises a binary outcome analysis.

8. The apparatus of claim 1, wherein the computer program code, when executed by the at least one processor, cause the at least one processor to perform steps further comprising:
   generating the first predictive value by comparing a property make, a property model, and a property year contained in the policy data to a property make, a property model, and a property year detected in the one or more digital image files.

9. The apparatus of claim 1, wherein the property damage restoration estimate is associated with an automobile.

10. The apparatus of claim 1, wherein the computer program code, when executed by the at least one processor, cause the at least one processor to perform steps further comprising:
receiving sensor data from one of a client device or property under review.

11. A non-transitory computer-readable medium, comprising instructions that, when executed by a data processing apparatus, cause the data processing apparatus to perform the steps of:
receiving, from a client device, a property damage restoration estimate request comprising a first set of one or more digital image files and device metadata, wherein a digital image file of the first set of one or more digital image files comprises a facial image and a plurality of pixels of a first digital image of one or more of a physical piece of property;
retrieving, from a repository and based at least in part on the device metadata, policy data associated with a user of the client device, the policy data comprising user identification properties including a policy holder facial image file and policy properties;
comparing the facial image to the retrieved policy holder facial image file;
determining a likelihood that at least one of the first set of one or more digital image files was fraudulently altered by generating a first predictive value, wherein generating the first predictive value comprises:
extracting each pixel of a plurality of pixels of each digital image file of the one or more digital files;
generating, for each digital image file, a multi-dimensional matrix comprising the plurality of pixels;
identifying, by evaluating each pixel based at least in part on a first machine learning model, any of the plurality of pixels or any groupings of pixels of the digital image file that have been manually or programmatically altered; and
generating the first predictive value based on the comparison and the identifying of any of the plurality of pixels or any groupings of the digital image file that have been manually or programmatically altered;
determining that the first predictive value does not exceed a fraud threshold;
generating, based at least in part on the first set of one or more digital image files and the retrieved policy data, a property damage restoration estimate; and
transmitting a property damage restoration estimate response comprising the property damage restoration estimate to the client device.

12. A computer-implemented method, comprising:
receiving, from a client device and by at least one processor, a property damage restoration estimate request comprising a first set of one or more digital image files and device metadata, wherein a digital image file of the first set of one or more digital image files comprises a facial image and a plurality of pixels of a first digital image of one or more of a physical piece of property;
retrieving, from a repository and by the at least one processor, based at least in part on the device metadata, policy data associated with a user of the client device, the policy data comprising user identification properties including a policy holder facial image file and policy properties;
comparing, by the at least one processor, the facial image to the retrieved policy holder facial image file;
determining, by the at least one processor, a likelihood that at least one of the first set of one or more digital image files was fraudulently altered by generating, by the at least one processor, a first predictive value, wherein generating the first predictive value comprises:
extracting each pixel of a plurality of pixels of each digital image file of the one or more digital files;
generating, for each digital image file, a multi-dimensional matrix comprising the plurality of pixels;
identifying, by evaluating each pixel based at least in part on a first machine learning model, any of the plurality of pixels or any groupings of pixels of the digital image file that have been manually or programmatically altered; and
generating, by the at least one processor, the first predictive value based on the comparison and the identifying of any of the plurality of pixels or any groupings of the digital image file that have been manually or programmatically altered;
determining, by the at least one processor, that the first predictive value does not exceed a fraud threshold;
generating, by the at least one processor and based at least in part on the first set of one or more digital image files and the retrieved policy data, a property damage restoration estimate; and
transmitting, by the at least one processor, a property damage restoration estimate response comprising the property damage restoration estimate to the client device.

* * * * *